United States Patent
Brugerolle et al.

(10) Patent No.: US 7,167,700 B2
(45) Date of Patent: Jan. 23, 2007

(54) INSTALLATION PROVIDING DATA CONCERNING AN OBJECT

(75) Inventors: Jean-Renaud Brugerolle, Paris (FR); Laurent Ferenczi, Parmain (FR)

(73) Assignee: L'Air Liquide, Société Anonyme à Directoire et Conseil de Surveillance pour l'Etude et l'Exploitation des Procédés Georges Claude, Paris (FR)

( * ) Notice: Subject to any disclaimer, the term of this patent is extended or adjusted under 35 U.S.C. 154(b) by 295 days.

(21) Appl. No.: 10/343,172

(22) PCT Filed: Jul. 25, 2001

(86) PCT No.: PCT/FR01/02437

§ 371 (c)(1),
(2), (4) Date: Sep. 9, 2003

(87) PCT Pub. No.: WO02/11059

PCT Pub. Date: Feb. 7, 2002

(65) Prior Publication Data

US 2004/0050940 A1   Mar. 18, 2004

(30) Foreign Application Priority Data

Jul. 27, 2000  (FR) ................................. 00 09876

(51) Int. Cl.
*H04M 11/10*  (2006.01)
(52) U.S. Cl. ............... 455/412; 455/419; 235/462.01
(58) Field of Classification Search ............. 455/419, 455/410, 414; 709/228; 235/462.01
See application file for complete search history.

(56) References Cited

U.S. PATENT DOCUMENTS

| 5,971,277 A | * | 10/1999 | Cragun et al. | ......... 235/462.01 |
| 2002/0068554 A1 | * | 6/2002 | Dusse | ......... 455/419 |
| 2004/0205198 A1 | * | 10/2004 | Zellner et al. | ......... 709/228 |

FOREIGN PATENT DOCUMENTS

| AU | 0 720 554 | 6/2000 |
| GB | 2 328 304 | 2/1999 |
| WO | WO 98 40823 | 9/1998 |
| WO | WO 98 57474 | 12/1998 |

OTHER PUBLICATIONS

International Search Report for PCT/FR01/02437.

* cited by examiner

*Primary Examiner*—Joseph Feild
*Assistant Examiner*—Phuoc Doan
(74) *Attorney, Agent, or Firm*—Brandon S. Clark

(57) ABSTRACT

An installation to provide data concerning an object. An electronic label, which includes data storage, is fixed on the object. The installation is capable of reading least part of the data stored by the label and is also capable of accessing a database which contains data concerning the object. The database is associated with an address in that database locating information is stored in the electronic label. The database is accessed on the basis of this locating data, which may be read by a reader. The installation may be used for marking and tracing gas packages.

25 Claims, 1 Drawing Sheet

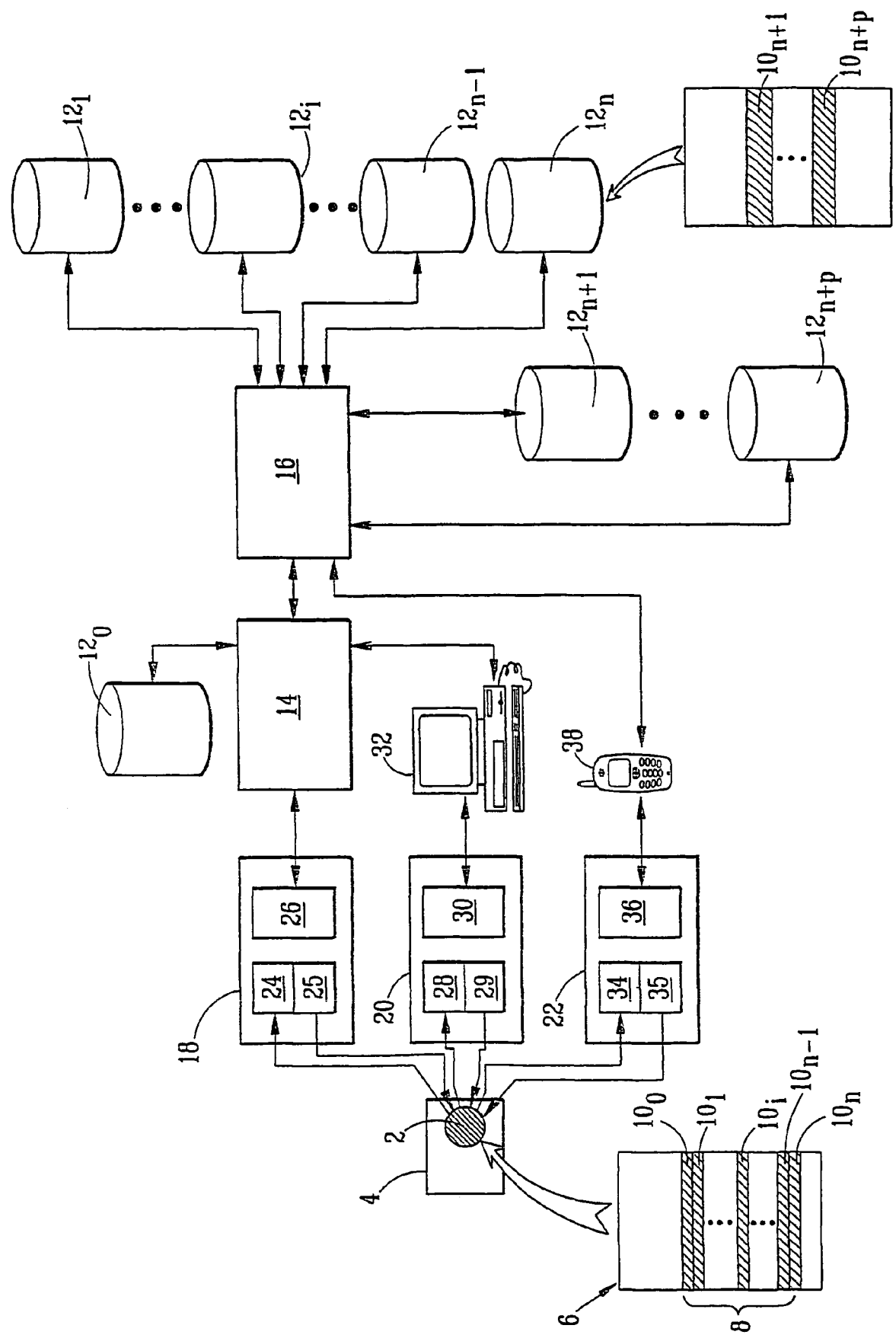

INSTALLATION PROVIDING DATA CONCERNING AN OBJECT

BACKGROUND

The present invention relates to an installation providing information concerning an object, comprising an electronic label fixed on this object and which includes means of storage of information, the installation also comprising means of reading of at least part of the information stored in the electronic label and means of access to at least one database containing complementary information concerning this object.

Generally, when it is applied to the tracing of gas packages affiliated to an industrial site, such an installation comprises an electronic label fixed on a package and including, in memory, a certain amount of information regarding the package as well as data identifying the package.

On the site to which the package is affiliated, the installation also associates with this electronic label a database comprising complementary information regarding the package and enables a user to access-same after recognition of the identifying data.

When this installation is applied to a multitude of packages affiliated to a multitude of sites, each of these sites comprising a database, a given label is recognized only by the database specific to the site to which the corresponding package is affiliated.

Thus, if during movements, a package changes site, the database of the new site where the package is to be found will not recognize the identifying data.

The invention aims to remedy the drawbacks of a conventional installation, by creating an installation capable of providing a user with complementary information concerning a gas package, which information is not stored on the electronic label of this package, this being regardless of the site where the package is to be found.

SUMMARY

The invention includes both methods and apparatus to achieve the desired results as described, but is not limited to the various embodiments disclosed.

The object of the invention is therefore an installation providing information concerning an object, comprising an electronic label fixed on this object and which includes means of storage of information, the installation also comprising means of reading of at least part of the information stored in the electronic label and means of access to at least one database containing complementary information concerning this object, characterized in that the database is associated with an address, in that database locating information is stored in the electronic label and in that the means of access are adapted for access to the database as a function of the locating information read by the means of reading.

Thus, an installation according to the invention makes it possible to access the complementary, information concerning a gas package, regardless of the site on which said package is to be found, by storing in the electronic label of the package, the data making it possible to access the spot where the complementary information is stored.

DESCRIPTION OF PREFERRED EMBODIMENTS

The installation providing information according to the invention can moreover comprise one or more of the following characteristics:

at least part of the locating information comprises the address associated with the corresponding database;

the means of access are adapted for access to the database through an information transmission network, and the address associated with the database includes its universal address on this network;

the information transmission network comprises at least one of the elements from among a network of Intranet type, a network of Extranet type, a network of Internet type, a switched telephone network and a wireless telecommunication network;

data for identifying the object which are associated with the locating information, are stored in the electronic label, and the means of access are adapted for access to the database as a function of the locating information and of the identifying data;

the means of access to the database comprise a wireless telecommunication device and the means of reading comprise an interface for exchanging information with the wireless telecommunication device;

the means of reading are integrated into the wireless telecommunication device;

the wireless telecommunication device comprises means of automatic transmission of data for locating the object to the database;

the installation comprises means of automatic tagging of the locating information in the means of storage by the means of reading;

the means of storage comprise means of limitation of access by the means of reading to the locating information of the database;

the means of reading comprise means of automatic updating of the locating information stored in the means of storage, in case of change of the address associated with the database; and the installation furthermore comprises at least one intermediate database containing locating information of a multiplicity of databases each containing complementary information concerning said object, the intermediate database is associated with an address, and at least part of the locating information stored in the electronic label comprises the address of the intermediate database.

The invention will be better understood with the aid of the following description, given merely by way of example and while referring to the appended drawing whose single FIGURE is a diagrammatic view of the general structure of an installation providing information.

The installation represented comprises an electronic label 2 of conventional type fixed on an object 4, such as a reusable package of an industrial gas.

This label 2 comprises rewritable means 6 of storing information on the package 4. These means of storage 6 comprise, as known per se, on the one hand an area of unrestricted access, where the stored information can be read without requiring any password and of other by a read-protected access area where a password is required to access the stored information. Data identifying the package 4 are stored in the means of storage 6. Moreover, a specific field 8, whose position is predetermined in the means of storage 6, stores information consisting of the addresses $10_0$, $10_1, \ldots, 10_i, \ldots, 10_n$ of respective databases $12_0$, $12_1, \ldots, 2_i, \ldots, 12_n$.

The expression address of a database is understood to mean an IP (Internet Protocol) address or else a universal address.

The universal address and the IP address are unique appellations which make it possible to locate a resource or a document on the Internet network. The universal address indicates the method of access thereto, the name of the server and the path within the server, whereas the less precise IP address indicates only the method of access thereto and the name of the server.

The databases $12_0$ to $12_{n-1}$ contain complementary information regarding the package 4, such as its place of manufacturer, its history, and its servicing program. The database $12_n$, for its part, is an intermediate database storing the addresses $10_{n+1}, \ldots, 10_{n+p}$, of a multiplicity of respective databases $12_{n+1}, \ldots, 12_{n+p}$, each containing complementary information regarding the package 4.

The use of an intermediate database makes it possible to structure access to the complementary information concerning the package 4 by grouping a certain amount of it together, when it relates to one and the same topic, for example.

The database $12_0$ is a local database, situated on the site to which the package 4 is affiliated. It is connected to a local information transmission network 14, of Intranet type. The local network 14 is itself connected to an external information transmission network 16, such as the Internet network.

To the Internet network 16 are also connected in a conventional manner either directly, or indirectly, the remote databases $12_1$ to $12_{n+p}$.

For example, each of the databases $12_1$ to $12_{n+1}$ is situated on an industrial site, analogous to that on which the database $12_0$ is situated and to which the package has been affiliated for a certain time, during its successive movements. Each database then comprises information concerning the package 4, written during its temporary affiliation to the site on which it is situated.

The device also comprises for each site with which packages 4 are affiliated, various means of reading 18, 20 and 22. These means of reading are adapted for reading the information stored in the means of storage 6 of the electronic label 2. They are also adapted for write-access to the means of storage 6 for automatic updates of this information.

Specifically, the first means of reading 18 comprise a reader 24 of electronic labels of conventional type, which is adapted for acquiring the information concerning the addresses $10_0, 10_1, \ldots 10_n$ and means of automatic updating 25 of this information in the electronic labels. These first means of reading also comprise an interface 26 for access to the databases $12_0$ to $12_{n+p}$, which is connected to the local network 14 and thus makes it possible either locally, or remotely, via the Internet network 16, to access the complementary information concerning the package 4 and which is stored in the databases $12_0$ to $12_{n-1}$ and $12_{n+1}$ to $12_{n+p}$, and then to display it on a screen (not represented).

The second means of reading 20 likewise comprise a reader 28 of electronic labels, identical to the reader 24, and means 29 of automatic updating, identical to the means of updating 25. These second means of reading also comprise an interface 30 for exchanging information with a microcomputer 32 linked to the local network 14. The microcomputer 32 is furnished with navigation software for browsing the Internet network 16 and the intranet 14 of conventional type, enabling it to access the databases $12_0$ to $12_{n+p}$.

Finally, the third means of reading 22 also comprise a reader 34 of electronic labels, identical to the reader 24, and means of automatic updating 35 identical to the means of updating 25. These third means of reading also comprise an interface 36 for exchanging information with a mobile telephone 38, the latter being adapted for access to the databases $12_0$ to $12_{n+p}$ via the Internet network 16, according to the WAP standard, known in the state of the art.

As is known per se, the mobile telephone comprises means of transmission to the Internet network 16 of locating data, conventionally of GPS or GSM type. These data are transmitted for example toward at least one database $12_0$ to $12_{n+p}$, in the guise of data for locating the package 4.

The manner of operation of the installation, whose structure has been described above, will now be detailed.

A user wishing to trace or obtain information regarding the gas package 4 is furnished with one of the means of, reading 18, 20 or 22 and places the reader 24, 28 or respectively 34 in proximity to the electronic label 2. All the information contained in the means of storage. 6, containing in particular the data identifying the package, is then transmitted to the means of reading, 18, 20 or 22, either directly if this information is stored in an area of unrestricted access of the means of storage 6, or indirectly, that is to say after validation of an identifier and of a password, if these data are stored in a read-protected area of the means of storage 6.

Among this information, that relating to addresses $10_0$ to $10_n$ is automatically locatable by the means of reading 18, 20 or 22, the latter comprising the data of predetermined position of the specific field 8 in the means of storage 6. These addresses are then used by the means of access 26, 32 or 38 to the databases to access the corresponding information pages, through the local network 14 and possibly through the Internet network 16.

Access to the information pages can be achieved directly if the addresses consist of universal addresses since the latter make it possible to locate the information pages exactly. If, on the other hand, the addresses consist of IP addresses, the means of access 26, 32 or 38 use the identifying data associated with the IP addresses to access respectively the information pages corresponding to the package 4.

If, after having transmitted a request to the information transmission network, the means of access 26, 32 or 38 are informed of the change of address of one of the databases $12_0$ to $12_n$, this new address is transmitted to them. They can then in their turn transmit it to the means of automatic updating 25, 29 or 35 so as to modify the corresponding address stored in the electronic label 2.

The means of access then display in a conventional manner the presentation pages corresponding to the universal addresses required or to the IP addresses required associated with the identifying data. These presentation pages are for example displayed according to the conventional HTML format on the screen of the microcomputer 32 or according to the conventional WML format of the WAP standard on the screen of the mobile telephone 38.

If the presentation pages contained in the databases $12_0$ to $12_{n-1}$ are involved, they contain complementary information regarding the package 4. If, on the other hand, the presentation page of the intermediate database $12_n$ is involved, it contains the addresses $10_{n+1}$ to $10_{n+p}$ of the complementary information databases $12_{n+1}$ to $12_{n+p}$. In a conventional manner, the databases $12_{n+1}$ to $12_{n+p}$ are accessed by selecting the corresponding addresses on the presentation page of the database $12_n$.

It is clearly apparent that an installation according to the invention allows the provision of a considerable amount of information concerning an object 4, such as a gas package intended to be moved around various industrial sites, by virtue of the presence on the package of an electronic label 2 comprising information concerning the addresses $10_0, \ldots, 10_n$ of databases comprising complementary information. Specifically, it is then sufficient to furnish oneself with means of reading 18, 20 or 22 electronic labels and with means of access 26, 32 or 38 to these databases, to obtain a complete set of information regarding the package.

It is also apparent that an installation according to the invention facilitates the tracing of the package 4. For example, in an application where the electronic label 2 comprises a single address $10_0$, that is to say that of the database $12_0$ situated on the site of affiliation of the package 4, it immediately makes it possible to ascertain the site of origin of the package if the latter is moved to another site. The package can then either be returned to its site of origin, or the complementary information can be transferred in a conventional manner from the database $12_0$ to the database of its new site of affiliation.

It will also be noted that the invention is not limited to the embodiment described.

Thus, as a variant, the third means of reading 22 are integrated into the mobile telephone 38, that is to say they are disposed in the same housing as the mobile telephone.

As a variant also, instead of consisting of a field 8 whose position is predetermined in the means of storage 6, the means of automatic tagging consist of a predetermined code stored in the means of storage 6 and known to the means of reading 18, 20 or 22, indicating that the information following this code concerns universal addresses.

Finally, as a variant, the external information transmission network 16 comprises an Extranet, a switched telephone network or a wireless telecommunication network.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. An installation providing information concerning a gas package (4), comprising an electronic label (2) fixed on this gas package (4) and which includes means of storage of information (6), the installation also comprising means of reading (18, 20, 22) of at least part of the information stored in the electronic label (2) and means of access (26, 32, 38) to at least one database ($12_0, \ldots, 12_{n-1}, 12_{n+1}, \ldots, 12_{n+p}$) containing complementary information concerning this gas package (4), wherein the database ($12_0, \ldots, 12_{n-1}, 12_{n+1}, \ldots, 12_{n+p}$) is associated with an address, in that database locating information ($10_0, \ldots, 10_n$) is stored in the electronic label (2), and wherein the database ($12_0, \ldots, 12_{n-1}, 12_{n+1}, \ldots, 12_{n+p}$) is a local database, situated on the site to which the gas package (4) is affiliated, and wherein data for identifying the gas package (4) which are associated with the locating information ($10_0, \ldots, 10_n$), are stored in the electronic label (2), and in that the means of access (26, 32, 38) are adapted for access to the database as a function of the locating information ($10_0, \ldots, 10_n$) and of the identifying data.

2. The installation providing information as claimed in claim 1, wherein at least part of the locating information ($10_0, \ldots, 10_{n-1}$) comprises the address associated with the corresponding database.

3. The installation providing information as claimed in claim 1, wherein the means of access (26, 32, 38) are adapted for access to the database ($12_0, \ldots, 12_{n-1}, 12_{n+1}, \ldots, 12_{n+p}$) through an information transmission network (14, 16), and in that the address associated with the database includes its universal address on this network.

4. The installation providing information as claimed in claim 2, wherein the means of access (26, 32, 38) are adapted for access to the database ($12_0, \ldots, 12_{n-1}, 12_{n+1}, \ldots, 12_{n+p}$) through an information transmission network (14, 16), and in that the address associated with the database includes its universal address on this network.

5. The installation providing information as claimed in claim 3, wherein the information transmission network (14, 16) comprises at least one of the elements from among a network of Intranet type, a network of Extranet type, a network of Internet type, a switched telephone network and a wireless telecommunication network.

6. The installation providing information as claimed in claim 4, wherein the information transmission network (14, 16) comprises at least one of the elements from among a network of Intranet type, a network of Extranet type, a network of Internet type, a switched telephone network and a wireless telecommunication network.

7. The installation providing information as claimed in claim 1, wherein the means of access to the database comprise a wireless telecommunication device (38) and in that the means of reading (22) comprise an interface (36) for exchanging information with the wireless telecommunication device (38).

8. The installation providing information as claimed in claim 2, wherein the means of access to the database comprise a wireless telecommunication device (38) and in that the means of reading (22) comprise an interface (36) for exchanging information with the wireless telecommunication device (38).

9. The installation providing information as claimed in claim 3, wherein the means of access to the database comprise a wireless telecommunication device (38) and in that the means of reading (22) comprise an interface (36) for exchanging information with the wireless telecommunication device (38).

10. The installation providing information as claimed in claim 4, wherein the means of access to the database comprise a wireless telecommunication device (38) and in that the means of reading (22) comprise an interface (36) for exchanging information with the wireless telecommunication device (38).

11. The installation providing information as claimed in claim 5, wherein the means of access to the database comprise a wireless telecommunication device (38) and in that the means of reading (22) comprise an interface (36) for exchanging information with the wireless telecommunication device (38).

12. The installation providing information as claimed in claim 6, wherein the means of access to the database comprise a wireless telecommunication device (38) and in that the means of reading (22) comprise an interface (36) for exchanging information with the wireless telecommunication device (38).

13. The installation providing information as claimed in claim 7, wherein the means of reading (22) are integrated into the wireless telecommunication device (38).

14. The installation providing information as claimed in claim 9, wherein the means of reading (22) are integrated into the wireless telecommunication device (38).

15. The installation providing information as claimed in claim 11, wherein the means of reading (22) are integrated into the wireless telecommunication device (38).

16. The installation providing information as claimed in claim 7, wherein the wireless telecommunication device

(38) comprises means of automatic transmission of data for locating the gas package (4) to the database ($12_0, \ldots, 12_{n+p}$).

17. The installation providing information as claimed in claim 9, wherein the wireless telecommunication device (38) comprises means of automatic transmission of data for locating the gas package (4) to the database ($12_0, \ldots, 12_{n+p}$).

18. The installation providing information as claimed in claim 11, wherein the wireless telecommunication device (38) comprises means of automatic transmission of data for locating the gas package (4) to the database ($12_0, \ldots, 12_{n+p}$).

19. The installation providing information as claimed in claim 13, wherein the wireless telecommunication device (38) comprises means of automatic transmission of data for locating the gas package (4) to the database ($12_0, \ldots, 12_{n+p}$).

20. The installation providing information as claimed in claim 14, wherein the wireless telecommunication device (38) comprises means of automatic transmission of data for locating the gas package (4) to the database ($12_0, \ldots, 12_{n+p}$).

21. The installation providing information as claimed in claim 15, wherein the wireless telecommunication device (38) comprises means of automatic transmission of data for locating the gas package (4) to the database ($12_0, \ldots, 12_{n+p}$).

22. The installation providing information as claimed in claim 1, wherein it comprises means (8) of automatic tagging of the locating information ($10_0, \ldots, 10_n$) in the means of storage (6) by the means of reading (18, 20, 22).

23. The installation providing information as claimed in claim 1, wherein the means of storage (6) comprise means of limitation of access by the means of reading (18, 20, 22) to the locating information ($10_0, \ldots, 10_n$) of the database.

24. The installation providing information as claimed in claim 1, wherein the means of reading (18, 20, 22) comprise means (25, 29, 35) of automatic updating of the locating information ($10_0, \ldots, 10_n$) stored in the means of storage (6), in case of change of the address associated with the database.

25. The installation providing information as claimed in claim 1, wherein it furthermore comprises at least one intermediate database ($12_n$) containing locating information ($10_{n+1}, \ldots, 10_{n+p}$) of a multiplicity of databases ($12_{n+1}, \ldots, 12_{n+p}$) each containing complementary information concerning the gas package (4), in that the intermediate database ($12_n$) is associated with an address, and in that at least part of the locating information ($10_n$) stored in the electronic label (2) comprises the address of the intermediate database ($12_n$).

* * * * *